United States Patent [19]

Dowdy

[11] Patent Number: 5,555,723
[45] Date of Patent: Sep. 17, 1996

[54] DUCTING FOR AN EXTERNAL GAS TURBINE TOPPING COMBUSTOR

[75] Inventor: Thomas E. Dowdy, Orlando, Fla.

[73] Assignee: Westinghouse Electric Corporation, Pittsburgh, Pa.

[21] Appl. No.: 235,001

[22] Filed: Apr. 28, 1994

[51] Int. Cl.$^6$ .................................................. F02C 6/00
[52] U.S. Cl. .......................................................... 60/39.182
[58] Field of Search ........................ 60/39.182, 267, 60/39.83, 39.3, 39.31

[56] References Cited

U.S. PATENT DOCUMENTS

| | | | |
|---|---|---|---|
| 3,208,132 | 9/1965 | Escher | 60/267 |
| 4,333,309 | 6/1982 | Coronel | 60/39.182 |
| 4,339,925 | 7/1982 | Eggmann et al. | 60/757 |
| 4,369,624 | 1/1983 | Hamm et al. | 60/39.12 |
| 4,845,940 | 7/1989 | Beér | 60/732 |

FOREIGN PATENT DOCUMENTS

| | | | |
|---|---|---|---|
| 2358553 | 2/1978 | France . | |
| 0909268 | 4/1954 | Germany | 60/39.182 |
| 0054021 | 9/1910 | Switzerland | 60/39.182 |
| 0142515 | 5/1920 | United Kingdom | 60/39.182 |

OTHER PUBLICATIONS

Berman et al. ASME paper, "A High Performance PFB System for Utility Application," 87GT36, (Jun. 1987).

Cooke, et al., "The Production of Coal–derived Fuel Gas For Powering Gas–Turbines Using Fluidised Bed Techniques," 13th International Congress on Combustion Engines, Vienna (1979).

Garland et al. Westinghouse Electric Corporation, "Second Generation PFBC System Research & Development Phase 2 Topping Combustor Development," Status Report, Dec. 1992.

Domeracki et al. Westinghouse Electric Corporation, "Topping Combustor Development for Second Generation PFBC Power Plants", Status Report, Dec. 1992.

Robertson et al., "Second Generation Pressurized Fluidized Bed Combustion Plant Conceptual Design and Optimization of a Second–Generation PFB Combustion Plant", Phase I Task I Report —vol. 1, Sep. 1989.

Primary Examiner—Timothy S. Thorpe
Attorney, Agent, or Firm—M. G. Panian

[57] ABSTRACT

A gas turbine power plant having a pressurized fluidized bed combustor and an external topping combustor. A cylindrical duct and a toroidal duct direct the flow of hot gas from the topping combustor and distribute it around the circumference of the turbine inlet. The walls of the duct are cooled by water or steam. The walls are formed by tubes, having cooling fluid passages formed therein, that extend between inlet and outlet manifolds. Elongated plate sections connect each tube to an adjacent tube so as to form a continuous gas barrier. If the walls are water cooled, the water that flows through the tubes for cooling is subsequently directed to a heat recovery steam generator, in which it is converted to steam for expansion in a steam turbine. If the walls are steam cooled, the steam is first generated in the heat recovery steam generator and then at least partially superheated by flowing through the walls.

14 Claims, 7 Drawing Sheets

DUCTING FOR AN EXTERNAL GAS TURBINE TOPPING COMBUSTOR

BACKGROUND OF THE INVENTION

The present invention relates to ducting for an external topping combustor in a gas turbine power plant. More specifically, the present invention relates to ducting for directing hot gas from an external combustor to a turbine that employs water/steam cooled walls.

The high efficiency, low capital cost and short lead time of gas turbine based systems make them particularly attractive to electric utilities as a means for producing electrical power. However, traditionally, gas turbine operation has been limited to expensive, sometimes scarce, fuels—chiefly distillate oil and natural gas. As a result of the ready availability and low cost of coal, considerable effort has been expended toward developing a gas turbine system for generating electrical power which can utilize coal as its primary fuel. One area in which these efforts have focused concerns systems in which the combustion of coal is carried out in a pressurized fluidized bed combustor, hereinafter PFBC.

In one of the simplest gas turbine/PFBC power plant arrangements, ambient air, compressed in the compressor section of the gas turbine, serves to fluidize the bed and provides combustion air for the PFBC. After combustion in the PFBC, the air, now at a high temperature and vitiated by the products of combustion and entrained particulate matter, is exhausted from the PFBC. The air then flows through a gas cleanup system wherein much of the particulate matter is removed. The air is then directed to the turbine section of the gas turbine where it is expanded, thereby producing useful shaft power. After expansion, the vitiated air exhausted from the turbine is vented to atmosphere.

The thermodynamic efficiency of such a system is poor, however, due to the need to limit the bed temperature, and hence the temperature of the air entering the turbine section, to approximately 870° C. (1600° F.) in order to optimize capture of the sulfur in the coal and avoid carryover of harmful alkali vapors into the turbine. This is in contrast to modern conventional gas or liquid fuel fired gas turbines, which can operate with turbine inlet gas temperatures as high as 1425° C. (2600° F.). As is well known in the art, increasing the temperature of the gas entering the turbine section increases the power output and efficiency of the gas turbine. Hence to achieve maximum efficiency, it has been proposed to employ a separate topping combustor—that is, a combustor external to the gas turbine—to raise the temperature of the air leaving the PFBC to the temperature required for maximum efficiency in the turbine.

Although the system discussed above offers the possibility of efficient use of coal in a gas turbine based system, certain considerations make it extremely difficult to utilize such a separate topping combustor. The primary area of difficulty arises due to the need to transport the very high temperature gas from the topping combustor to the turbine section of the gas turbine. Ducts capable of carrying such hot gas would be subject to high temperature and thermal stress, especially if, as is optimal from the thermodynamic standpoint, the gas is heated in the topping combustor to a temperature suitable for use in a modern high efficiency gas turbine (i.e., approximately 1425° C. (2600° F.)). One approach to solving this problem involves forming the duct from a high temperature alloy. However, such alloys are expensive and difficult to weld. Moreover, their life under the conditions to which they will be subjected in such a duct will likely negatively impact the availability of the power plant.

Accordingly, it would be desirable to provide a durable duct capable of transporting hot gas from an external topping combustor to the turbine section of a gas turbine.

SUMMARY OF THE INVENTION

Accordingly, it is the general object of the current invention to provide a durable duct capable of transporting hot gas from an external topping combustor to the turbine section of a gas turbine.

Briefly, this object, as well as other objects of the current invention, is accomplished in a gas turbine power plant comprising (i) a compressor for producing compressed air, (ii) a combustor for burning a fuel in the compressed air so as to produce a hot compressed gas, (iii) a turbine for expanding the hot compressed gas so as to generate power in a rotating shaft thereof, thereby producing an expanded gas, and (iv) a duct disposed between the combustor and the turbine for directing the flow of the hot compressed gas therebetween. The duct has a wall for containing the hot compressed gas, and there are a plurality of water flow passages formed within the wall.

In one embodiment of the invention, the duct wall comprises a plurality of tubes and a plurality of plate sections. The tubes have passages therein forming at least a portion of the water flow passages and each of the plate sections extends between and connects a pair of tubes. This embodiment further comprises (i) a source of feed water, (ii) a steam generator having means for generating steam by transferring heat from the expanded gas to the feed water, and (iii) means for flowing at least a portion of the feed water through the water flow passages in the duct wall.

DESCRIPTION OF THE PREFERRED EMBODIMENT

Figure 1:
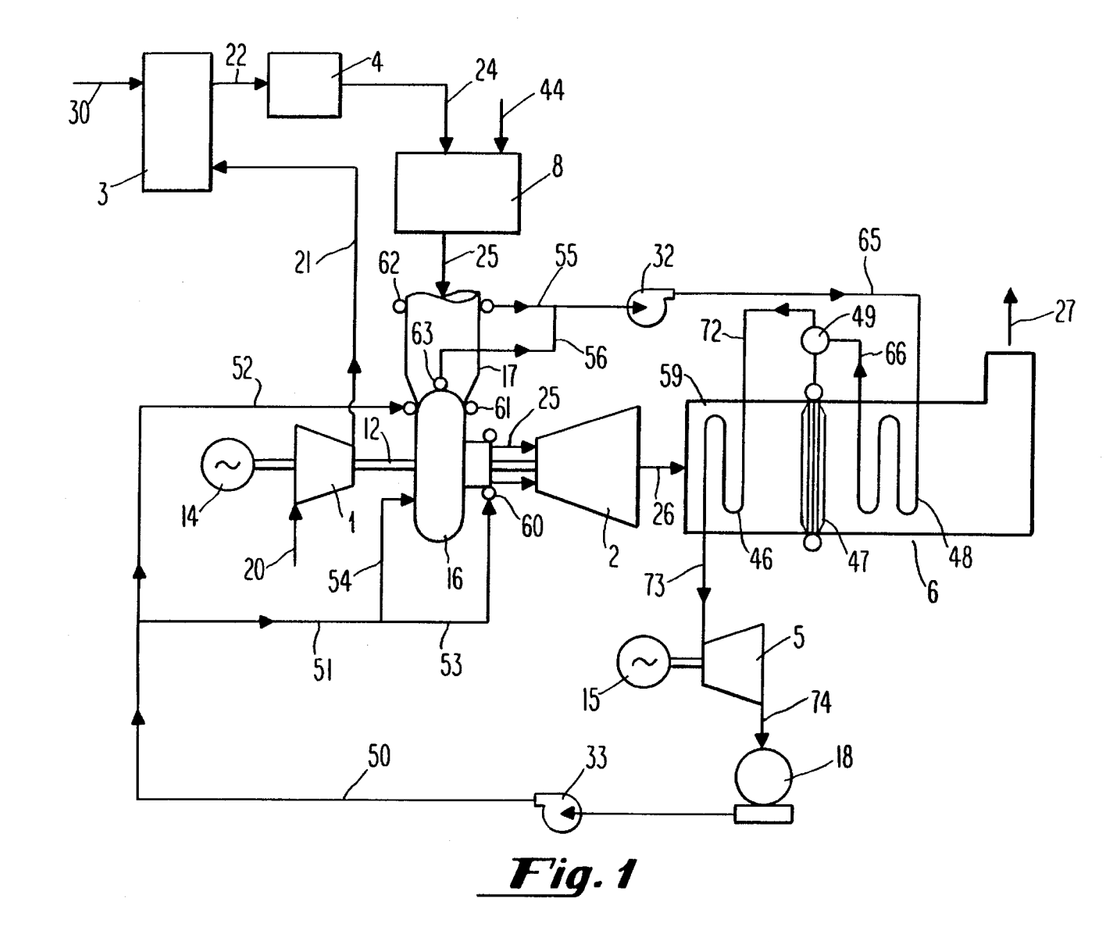
FIG. 1 is a schematic diagram of a gas turbine power plant employing the ducts of the current invention.

Referring to the drawings, there is shown in FIG. 1 a gas turbine power plant according to the current invention. The major components of the power plant include a compressor 1, a turbine 2, a pressurized fluidized bed combustor (hereafter PFBC) 3, a gas cleanup system 4, a steam turbine 5, a heat recovery steam generator (hereinafter HRSG) 6, a topping combustor 8, electrical generators 14 and 15, ducts 16 and 17, and a condenser 18.

Figure 2:
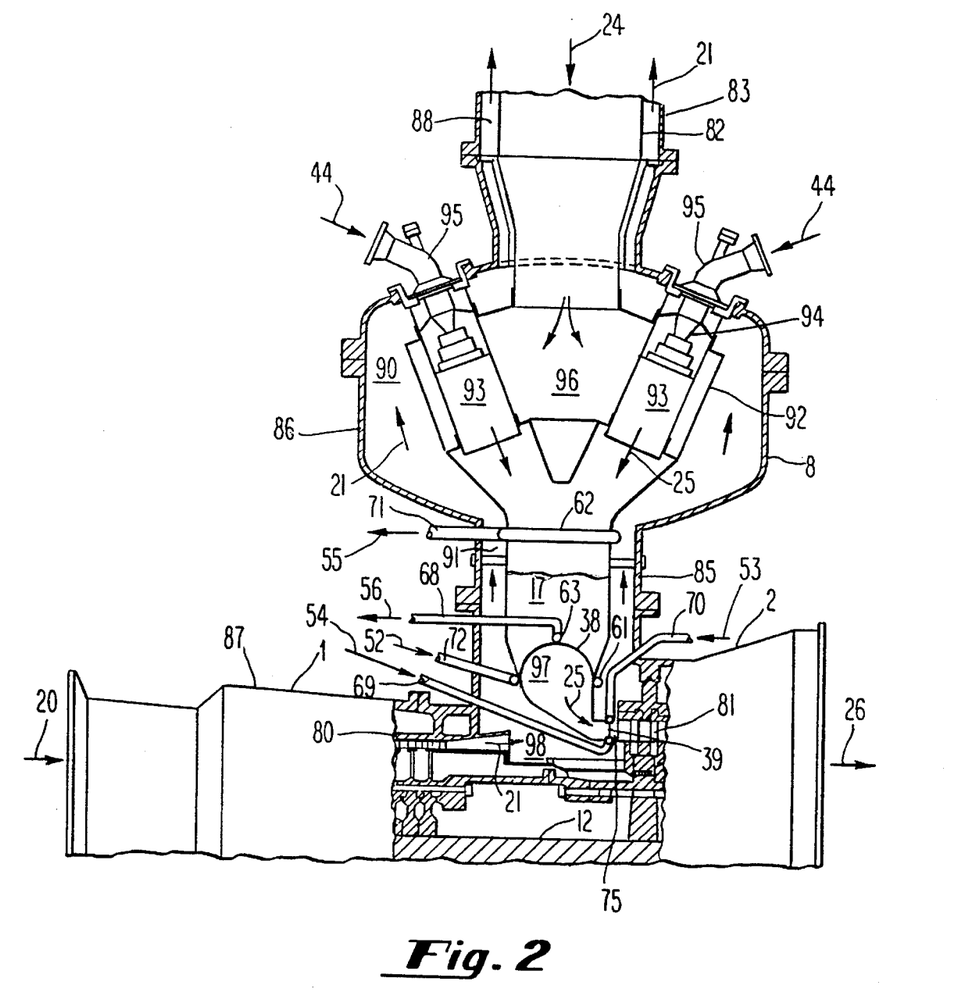
FIG. 2 is a partial longitudinal cross-section through the gas turbine shown in FIG. 1.

The compressor 1, which includes rows of stationary vanes and rotating blades 80, shown in FIG. 2, inducts ambient air 20 and produces compressed air 21 that is directed to the PFBC 3. The PFBC 3 comprises a combustion chamber in which a solid fuel 30, such a coal, is maintained in a pressurized fluidized bed to promote combustion. The compressed air 21 fluidizes the bed and supplies the oxygen necessary for combustion of the solid fuel 30 in the PFBC 3. The amount of solid fuel 30 burned in the PFBC 3 depends on the desired temperature of the gas 22 discharged from the PFBC but, as previously discussed, is generally limited to approximately 870° C. (1600° F.).

The hot gas 22 from the PFBC 3, now vitiated by the combustion products, flows through a gas cleanup system 4 in which particulates, chiefly coal slag and ash, as well as sulfur species and alkali species, are removed. The clean hot gas 24 is then combusted in a topping combustor 8 supplied with supplemental fuel 44, which may be natural gas or a coal derived fuel. In the preferred embodiment, sufficient fuel 44 is burned in the topping combustor 8 to raise the temperature of the hot gas 25 discharging from the topping combustor to a optimum temperature for the turbine 2, which, in a modern gas turbine, may be as high as 1390° C. (2540° F.) or higher.

The hot gas 25 from the topping combustor 8 is then directed by ducts 16 and 17 to the inlet of the turbine 2. In the turbine 4, the hot gas is expanded and produces rotating power in the shaft 12. This shaft power not only drives the compressor 1 but also drives the electrical generator 14, thereby producing electrical power. The expanded gas 26 discharged from the turbine 2 is directed to the HRSG 6.

The HRSG 6 comprises a duct 59 that encloses various heat transfer sections, such as a superheater 46, an evaporator 47 and a economizer 48. After transferring heat from the expanded gas 26 to feed water 65 so as to generate superheated steam 73, as discussed below, the expanded gas 27, now considerably cooled, is vented to atmosphere.

The superheated steam 73 produced in the HRSG 6 is expanded in the steam turbine 5, thereby generating additional electrical power in the electrical generator 15. The expanded steam 74 discharged from the steam turbine 5 is condensed in a condenser 18. The feed water 50 from the condenser 18, now at a relatively low pressure, is directed by pump 33 to the ducts 16 and 17 after being split into two streams 51 and 52. Feed water stream 51 is directed to the toroidal duct 16, after which it is again split into two streams 53 and 54. Feed water steam 52 is directed to the cylindrical duct 17. The feed water steams 52, 53 and 54 serve to absorb heat from the hot gas 25 by flowing through a large number of passages in tubes that form the walls of the ducts, thereby cooling the duct walls, as discussed further below.

The heated feed water streams 55 and 56 discharged from the ducts 16 and 17 are recombined and pressurized by pump 32. Pump 32 directs the heated water 65 to the HRSG 6, so that it forms the feed water that is further heated in economizer 48. From the economizer 48, the further heated feed water 66 is directed to a steam drum 49, from which it is circulated through the evaporator 47 and converted to steam 72. The saturated steam 72 from the drum 49 is then superheated in the superheater 46 and returned to the steam turbine 5 for expansion, making an essentially closed loop system.

As shown in FIG. 2, the topping combustor 8 is disposed externally from the shells 87 and 88 that enclose the compressor 1 and turbine 2, respectively. The topping combustor 8 is formed by a vessel 86 that encloses a chamber 90 in which a plurality of combustor baskets 93 are disposed. Preferably the combustor baskets 93 are of the multiple annular swirl type, such as that disclosed in U.S. Pat. No. 4,845,940 (Beer), herein incorporated by reference in its entirety.

Inner and outer concentric ducts 17 and 85 are connected to the vessel 86 and form an annular passage 91. The annular passage 91 directs the compressed air 21 from a chamber 98, into which the compressor 1 discharges, to the topping combustor 8. In the topping combustor 8, the compressed air 21 flows through the chamber 90 and then into a second annular passage 88 formed by a second set of inner and outer concentric ducts 82 and 83 that are connected to the vessel 86. From the passage 88, the compressed air 21 is directed to the PFBC 3, as shown in FIG. 1. As a result of this arrangement, the compressed air 21 serves to cool the components of the topping combustor 8.

The hot gas 24 from the PFBC 3 is directed to the topping combustor 8 by the inner pipe 82. From the inner pipe 82, the hot gas 24 flows into a space 96 within the chamber 90 that is separated from the compressed air 21 by a liner 92. From the space 96, the hot gas 24 flows into the combustor baskets 93. The supplemental fuel 44 is directed by pipes 95 to fuel nozzles 94 that inject it into the combustor baskets 93. In the combustor baskets 93, the fuel 44 is combusted in the hot gas 24, which still contains considerable oxygen, thereby producing the further heated gas 25. In the preferred embodiment, sufficient supplemental fuel 44 is supplied to the topping combustor to heat the gas 25 to a temperature in excess of 1200° C. (2200° F.), and preferably to approximately 1390° C. (2540° F.) or higher depending on the limitations of the components in the turbine section 2.

The duct 17, which is essentially cylindrical, then directs the hot gas 25 to a toroidal manifold 97 formed by the toroidal duct 16. The toroidal duct 16 has an opening formed in its outer circumference that mates with the outlet of the cylindrical duct 17, thereby forming an inlet 38 for the toroidal manifold 97. The toroidal duct 16, which separates the hot gas 25 from the compressed air 21 flowing through the chamber 98, encircles the rotor shaft 12. In addition, the toroidal duct 16 forms an annular outlet 39 that distributes the hot gas 25 circumferentially around the inlet 75 of the turbine 2. As is conventional, the turbine 2 contains rows of stationary vanes and rotating blades 81 that cause the hot gas 25 to expand, thereby producing power to drive the rotor 12.

Figure 3:
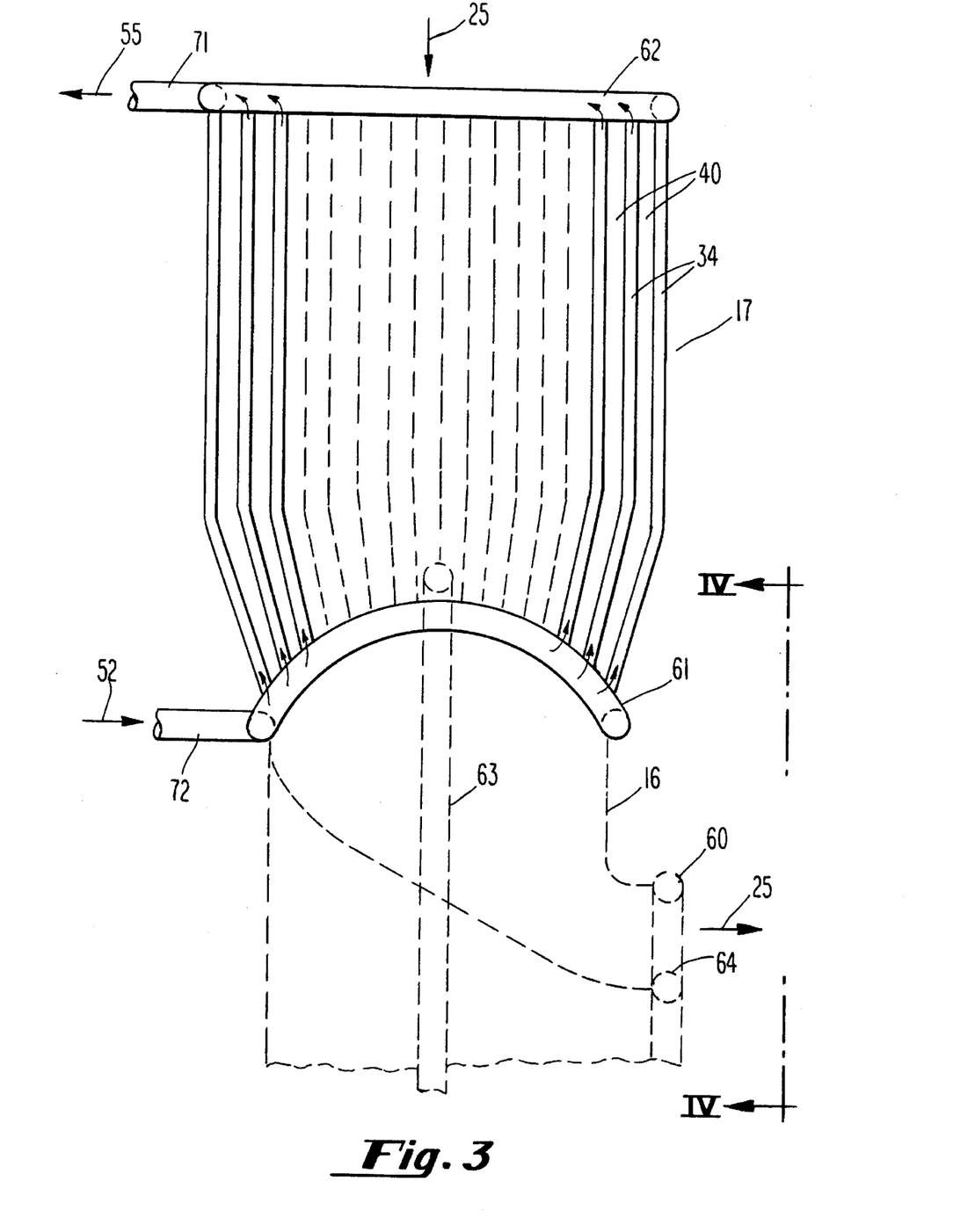
FIG. 3 is a side view of the cylindrical duct connecting the toroidal duct to the topping combustor, with the toroidal duct being shown in phantom.
Figure 6:
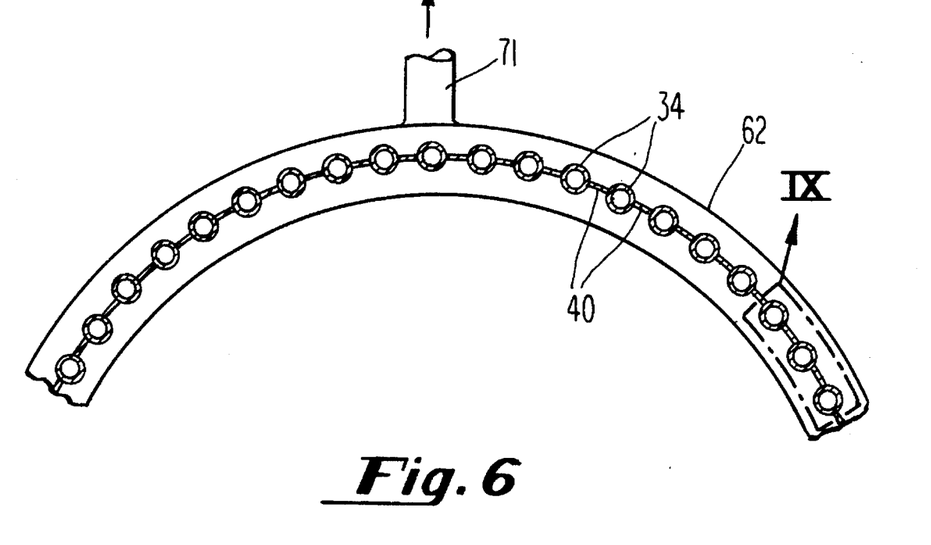
FIG. 6 is a cross-section taken along line VI—VI shown in FIG. 3.
Figure 9:
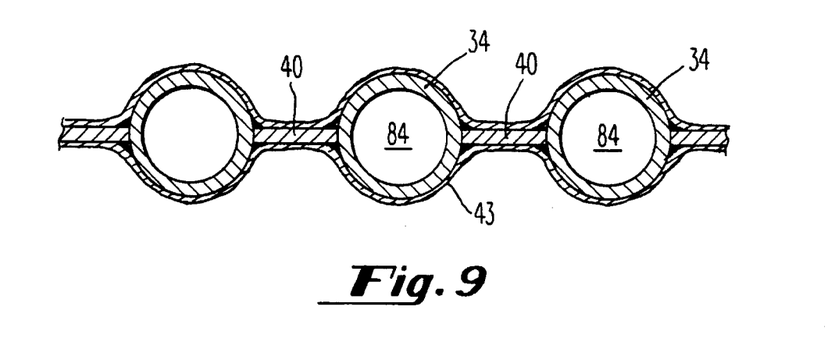
FIG. 9 is an enlarged view of a portion of the duct wall enclosed by the oval denoted IX in FIG. 6.

As shown in FIGS. 3, 6 and 9, the cylindrical duct 17 has walls that are formed by a circular array of longitudinally extending parallel tubes 34, with each of the tubes alternating with an elongated plate 40. As shown in FIG. 9, each tube 34 has a passage 84 formed therein that allows the feed water stream 52 to flow through the tube.

As shown in FIG. 3, the tubes 34 extend between an inlet manifold header 61 and an outlet manifold header 62. These manifold headers serve to distribute and collect the water flowing through the tubes (the distribution of the feed water into many small streams that flow through each tube and their subsequent collection is shown best in FIG. 4, which, although directed to the toroidal duct 16, is equally applicable to the cylindrical duct 17 in this regard). The inlet manifold header 61 encircles the gas outlet of the cylindrical duct 17 along the intersection between the cylindrical duct 17 and the toroidal duct 16, so that the inlet manifold header 61 is approximately saddle shaped. An inlet pipe 72 connected to the inlet manifold header 61 allows the pump 33 to direct the feed water 52 from the inlet manifold header through the tubes 34 to the outlet manifold header 62.

The outlet manifold header 62 is circular and encircles the gas inlet of the cylindrical duct 17, as shown in FIG. 6. An outlet pipe 71 connected to the outlet manifold header 62 directs the now heated feed water 55 to the pump 32, where it is forwarded to the HRSG 6, as previously discussed.

As shown best in FIG. 9, each tube 34 is connected to an adjacent tube by an elongate plate section 40 that is welded between the tubes. Thus, the array of tubes 34 and plates 40 forms a cylindrical water-cooled wall that contains the hot gas 25 and directs it from the topping combustor 8 to the toroidal duct 16.

Although the heat transferred from the hot gas 25 to the feed water 52 flowing through the cylindrical duct 17 is returned to the cycle by aiding the generation of steam in the HRSG 6, it is still desirable to minimize such heat transfer so as to take as little heat as possible from the hot gas 25 prior to its expansion in the turbine 2. Accordingly, a thermal barrier coating 34, such as a ceramic type well known in the art, may be used on the surfaces of the tubes 34 and plate sections 40 to retard heat transfer, as shown in FIG. 9.

Figure 4:
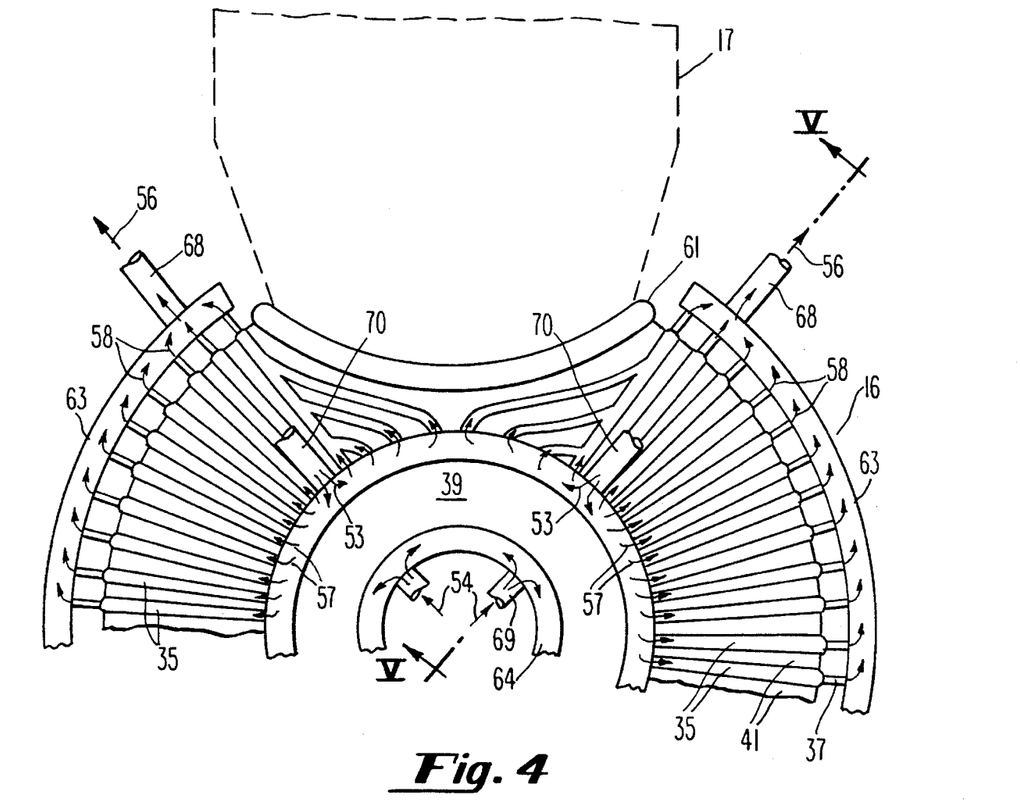
FIG. 4 is a view, looking into the direction of flow, taken along line IV—IV shown in FIG. 3 and showing the upper half of the toroidal duct, with the cylindrical duct shown in phantom.
Figure 5:
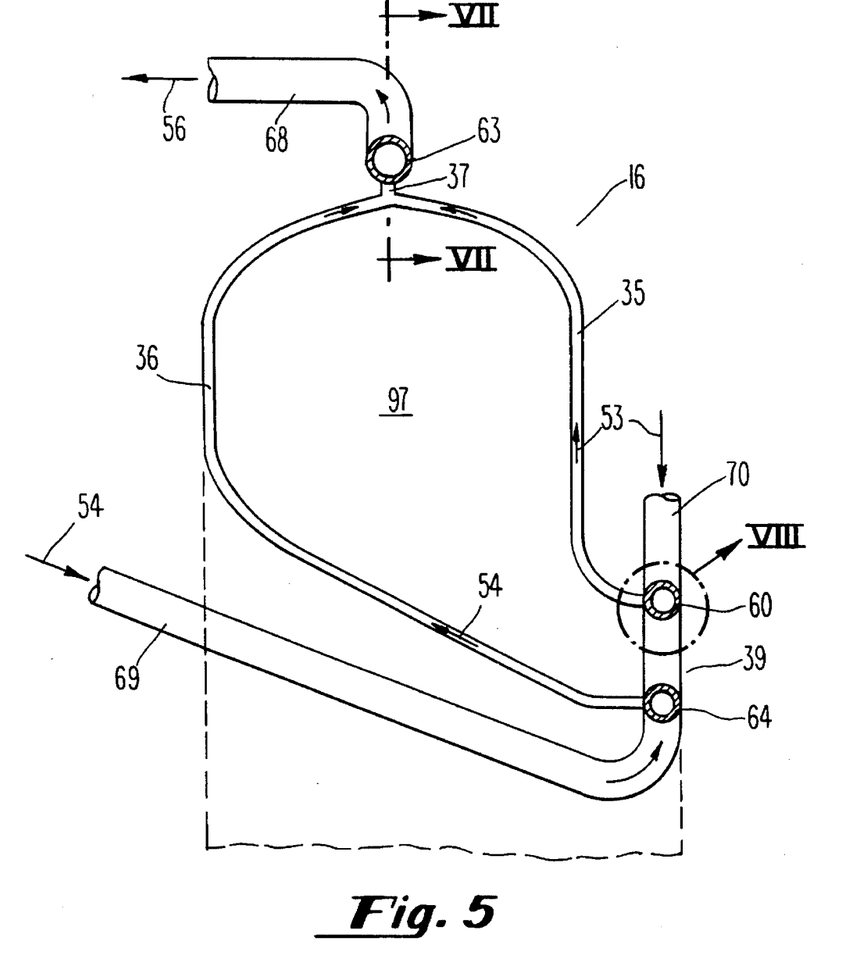
FIG. 5 is a cross-section taken through line V—V shown in FIG. 4.

Similarly, as shown in FIGS. 4 and 5, the toroidal duct 17 has water-cooled walls that are formed by a circular array of tubes 35 and 36, each of which alternates with an elongated plate 41. The tubes 35 and 36 and the plates 41 are joined in the same manner as that shown in FIG. 9 for the circular duct 17 and may also be coated with the thermal barrier 43. In addition, as in the circular duct 17, the tubes 35 have passages formed therein that allow the feed water streams 53 and 54 to flow through the tubes.

As shown in FIG. 5, the forward wall of the toroidal duct 16 is formed by the tubes 36, which extend radially outward and rearward in an arcuate path between an inner inlet manifold header 64 and an outlet manifold header 63. These manifold headers serve to distribute and collect the water flowing through the tubes 36. The inner inlet manifold header 64 is circular, as shown best in FIG. 4, and is encircled by the annular outlet 39 of the toroidal duct 16. Inlet pipes 69 are connected to the inner inlet manifold header 64 and allows the pump 33 to direct the feed water 54 through the tubes 36.

As also shown in FIG. 5, the rear wall of the toroidal duct 16 is formed by the tubes 35, which extend radially outward and forward in an arcuate path between an outer inlet manifold header 60 and the outlet manifold header 63. These manifold headers serve to distribute and collect the water flowing through the tubes 35. The outer inlet manifold header 60 is circular, as shown best in FIG. 4, and encircles the annular outlet 39 of the toroidal duct 16. Inlet pipes 70 are connected to the outer inlet manifold header 60 and allows the pump 33 to direct the feed water 53 through the tubes 35. As shown in FIG. 4, the outer inlet manifold 60 distributes the incoming feed water 53 into a plurality of small streams 57 each of which flows through one of the tubes 35.

Figure 8:
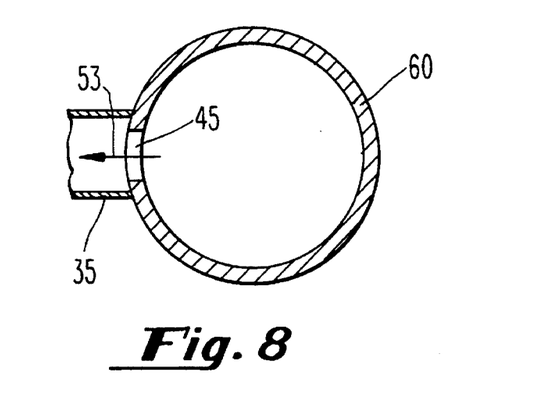
FIG. 8 is an enlarged view of a portion of the inlet manifold header enclosed by the circle denoted VIII in FIG. 5.

As shown in FIG. 8, openings 45 formed in the outer inlet manifold header 60 discharge the feed water 53 to the tubes 35. As can be seen, the opening 45 is smaller than the inside diameter of the tube 35 so that the opening forms an orifice that imparts a sufficient pressure drop to ensure that the feed water 53 is evenly distributed to the tubes 35. A similar approach is used with respect to the inner inlet manifold header 64 of the toroidal duct 16, as well as the inlet manifold header 61 of the cylindrical duct 17.

Figure 7:
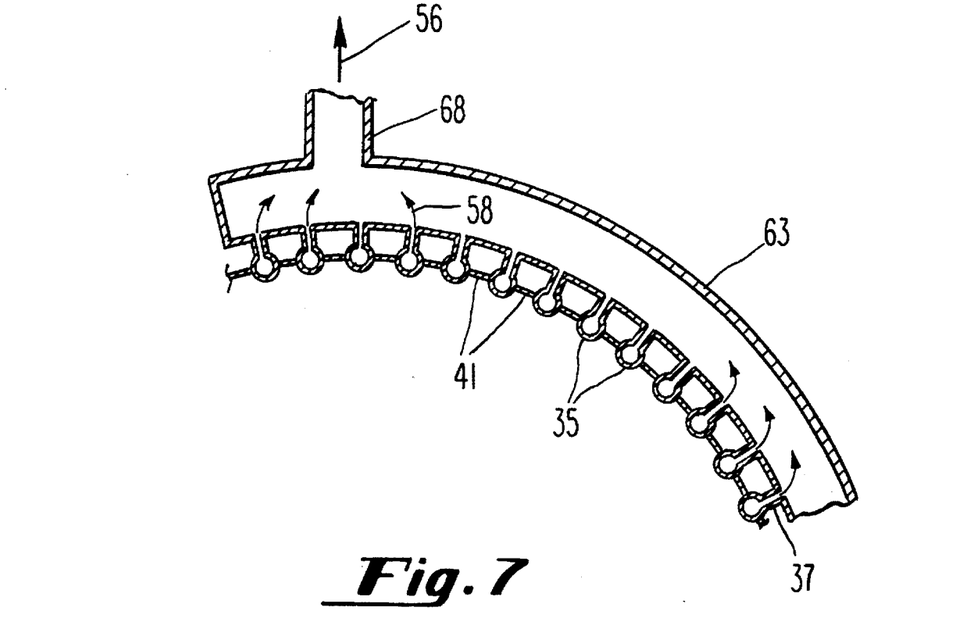
FIG. 7 is a cross-section taken along line VII—VII shown in FIG. 5.

As shown in FIGS. 4 and 7, the outlet manifold header 63 is circular and encircles the toroidal duct 16 at its point of maximum diameter. A short section of tubing 37 connects each of the tubes 35 and 36, at their point of intersection, with the outlet manifold header 63. The outlet manifold header 63 collects the streams 58 of the now heated feed water from each of the tubes 35 in the rear wall, as shown in FIG. 4, as well as the streams from each of the tubes 36 in the forward wall. The outlet manifold header 63 then discharges these streams via outlet pipes 68 to the pump 32, where they are forwarded to the HRSG 6, as previously discussed.

Thus, as in the circular duct 17, the array of tubes 35 and 36 and the plates 41 form toroidal water-cooled walls that (i) contain the hot gas 25, (ii) separate it from the compressed air 21 flowing through the chamber 8, and (iii) direct it from the circular duct 17 to the turbine inlet 75.

As a result of the use of the water-cooled walls in the ducts 16 and 17, the temperature to which the hot gas 25 is heated by the topping combustor 8 can be set to optimize the output from the turbine 2 and need not be limited by considerations of the effect the hot gas will have on these ducts. In addition, as a result of the water cooling, the duct walls will be cool enough to allow the tubes and plates to be made from low alloy steel so that the use of high temperature exotic alloys is not required.

Figure 10:
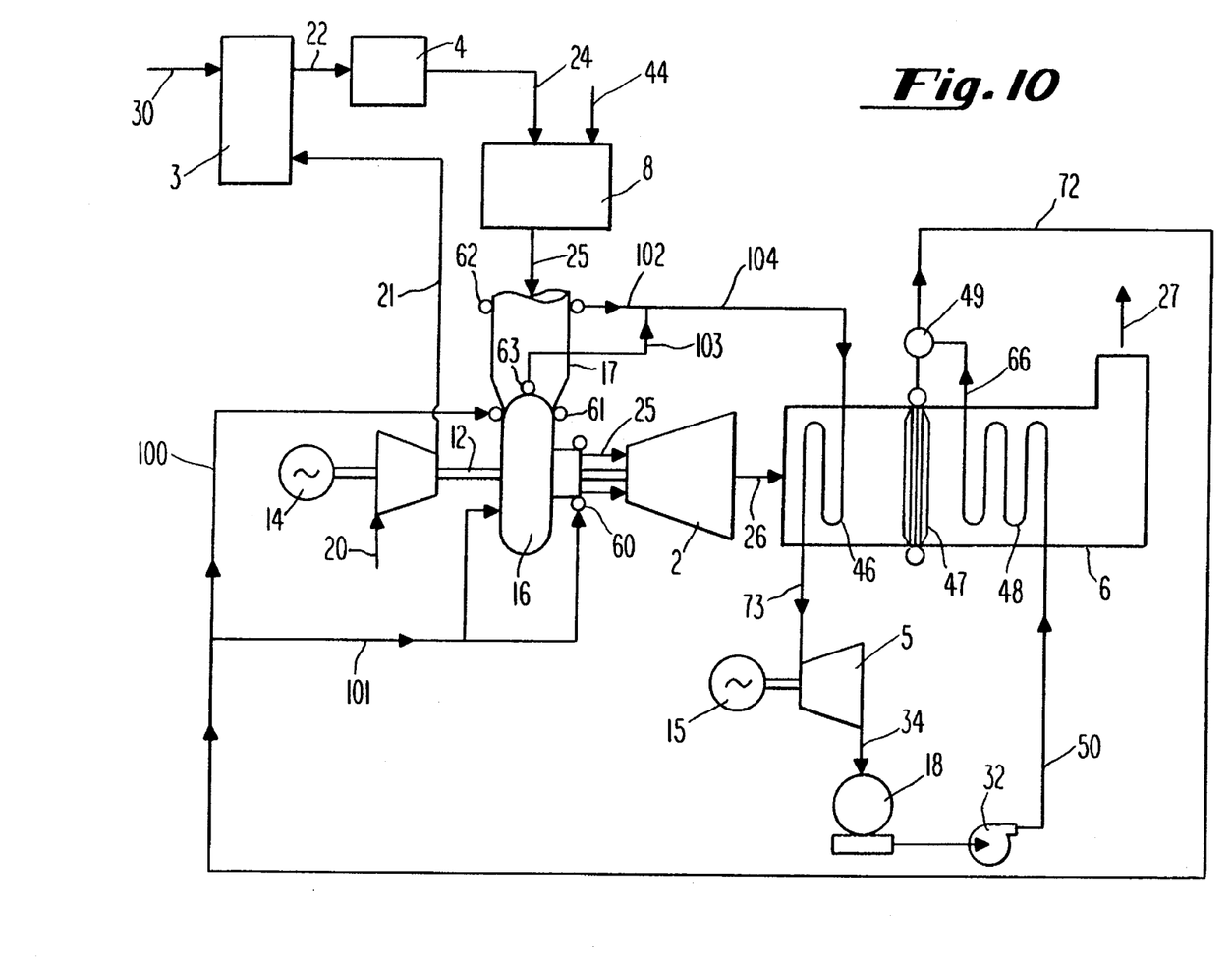
FIG. 10 is a schematic diagram of an alternate embodiment of the gas turbine power plant employing the ducts of the current invention.

FIG. 10 shows an alternate embodiment of the current invention in which the walls of the ducts 16 and 17 are steam cooled, rather than water cooled. The compressed air and gas flow path in this embodiment is the same as that shown in FIG. 1. However, from the condenser 18, the feed water 50 is pressurized by pump 32 and forwarded directly to the HRSG 6. The heated feed water 66 from the economizer 48 circulates through the evaporator 47 from the steam drum 49, as before. However, the saturated steam 72 from the drum 49 is split into streams 100 and 101. Steam stream 100 is directed to the inlet manifold header 61 of the cylindrical duct 17. The steam 100 flows through the walls of the cylindrical duct 17, in the manner previously discussed with respect to feed water stream 52, and is discharged by the outlet manifold header 62 as superheated steam 102. Steam stream 101 is directed to the inner and outer inlet manifold headers 60 and 64 of the toroidal duct 16. The steam 101 flows through the walls of the toroidal duct 16, in the manner previously discussed with respect to feed water streams 53 and 54, and is discharged by the outlet manifold header 63 as superheated steam 103.

The streams of superheated steam 102 and 103 are then combined and the steam 104 directed through the superheater section 46 of the HRSG 6 for further superheating. The further superheated steam 73 is then expanded in the steam turbine 5, as before. Although steam will not cool the walls of the ducts 16 and 17 as effectively as the feed water, it will result in reduced heat transfer from the hot gas 25.

Although present invention has been discussed with reference to a gas turbine power plant utilizing a PFBC, the invention is also applicable to other arrangements utilizing external combustors. Accordingly, the present invention may be embodied in other specific forms without departing from the spirit or essential attributes thereof and, accordingly, reference should be made to the appended claims, rather than to the foregoing specification, as indicating the scope of the invention.

I claim:

1. A gas turbine power plant comprising:
   a) a compressor for producing compressed air;
   b) a combustor for burning a fuel in said compressed air so as to produce a hot compressed gas;
   c) a turbine for expanding said hot compressed gas so as to generate power in a rotating shaft thereof, thereby producing an expanded gas wherein said compressor and said turbine are enclosed by a shell, and said combustor is disposed externally from said shell;
   d) a duct disposed between said combustor and said turbine for directing the flow of said hot compressed gas there-between, said duct having a wall containing said hot compressed gas and wherein said duct wall forms a toroidal chamber encircling said turbine shaft, a plurality of water flow passages formed within said wall;
   e) a source of feed water;
   f) a steam generator having means for generating steam by transferring heat from said expanded gas to said feed water; and
   g) means for flowing at least a portion of said feed water through said water flow passages in said duct wall and then through said steam generating means.

2. The gas turbine power plant according to claim 1, wherein said duct wall comprises a plurality of tubes, said tubes having passages therein forming at least a portion of said water flow passages.

3. The gas turbine power plant according to claim 2, wherein said duct wall further comprises a plurality of plate sections, each of said plate section extending between and connecting a pair of tubes.

4. The gas turbine power plant according to claim 3, wherein at least of portion of the surfaces of each of said plate sections and said tubes are directly exposed to said hot compressed gas.

5. The gas turbine power plant according to claim 3, wherein said duct wall further comprises a layer of material coating at least a portion of the surfaces of each of said tubes, said coating forming a thermal barrier separating said tubes from said hot compressed gas.

6. The gas turbine power plant according to claim 1, wherein said duct further comprises water inlet and outlet manifolds, said water passages placing said water inlet manifold in flow communication with said water outlet manifold.

7. The gas turbine power plant according to claim 1, wherein said combustor is a first combustor, and further comprising a second combustor, said second combustor being a pressurized fluidized bed combustor.

8. The gas turbine power plant according to claim 7, wherein said first and second combustors are in hot gas flow communication, said first combustor being disposed downstream from said second combustor with respect said hot gas flow.

9. A gas turbine power plant comprising:
   a) a compressor for producing compressed air;
   b) a combustor for burning a fuel in said compressed air so as to produce a hot compressed gas;
   c) a turbine for expanding said hot compressed gas so as to generate power in a rotating shaft thereof, thereby producing an expanded gas, said turbine having an annular inlet for receiving said hot compressed gas;
   d) a first duct having an approximately toroidal shape and encircling said shaft, said toroidal duct forming:
      (i) an inlet for receiving said hot compressed gas from said combustor and an annular outlet for distributing said hot compressed gas circumferentially around said turbine inlet, whereby said hot compressed gas flows through said toroidal duct from said combustor to said turbine, and
      (ii) a wall for directing said hot compressed gas from said inlet to said outlet, said wall formed by a plurality of alternating elongated plates and tubular members, each of said plates connecting two adjacent tubular members having a passage formed therein through which a cooling fluid flows;
   e) a chamber through which said compressed air from said compressor flows, wherein said toroidal duct is disposed within said chamber, said toroidal duct wall separating said hot compressed gas from said compressed air; and
   f) a second duct connected to said toroidal duct inlet, said second duct having an approximately cylindrical wall formed by a plurality of alternating elongated plates and tubular member, each of said plates connecting two adjacent tubular members, each of said tubular members having a passage formed therein through which a cooling fluid flows.

10. The gas turbine power plant according to claim 9, further comprising cooling fluid inlet and outlet manifolds, each of said tubular members connecting said inlet manifold with said outlet manifold.

11. The gas turbine power plant according to claim 10, wherein one of said cooling fluid manifolds comprises first and second headers, said first header encircling said toroidal duct annular outlet and said second header encircled by said toroidal duct annular outlet.

12. The gas turbine power plant according to claim 9, further comprising means for transferring heat from said expanded gas produced by said turbine to said cooling fluid.

13. The gas turbine power plant according to claim 9, wherein said cooling fluid is pressurized water.

14. The gas turbine power plant according to claim 9, wherein said cooling fluid is steam.

* * * * *